United States Patent
Lee et al.

(10) Patent No.: US 7,983,555 B2
(45) Date of Patent: Jul. 19, 2011

(54) CAMERA MODULE

(75) Inventors: Chai-Wei Lee, Taipei Hsien (TW); Hou-Yao Lin, Taipei Hsien (TW); Sheng-Jung Yu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/768,739

(22) Filed: Apr. 28, 2010

(65) Prior Publication Data

US 2011/0091199 A1 Apr. 21, 2011

(30) Foreign Application Priority Data

Oct. 16, 2009 (CN) .......................... 2009 1 0308365

(51) Int. Cl.
*G03B 17/02* (2006.01)
(52) U.S. Cl. ........................................ 396/533; 396/535
(58) Field of Classification Search .................. 396/533, 396/535, 541
See application file for complete search history.

(56) References Cited

U.S. PATENT DOCUMENTS

| 7,773,876 B2 * | 8/2010 | Westerweck et al. | 396/535 |
| 2008/0062535 A1 * | 3/2008 | Lin | 359/694 |
| 2010/0271541 A1 * | 10/2010 | Chou | 348/374 |

* cited by examiner

*Primary Examiner* — W. B. Perkey
*Assistant Examiner* — Dennis Hancock
(74) *Attorney, Agent, or Firm* — Raymond J. Chew

(57) ABSTRACT

An exemplary camera module includes a barrel, a holder, and a compressed resilient spring member. The barrel includes a first cylindrical part and a first threaded part. The first threaded part includes external threads. The barrel further includes a first surface facing the object side. The holder includes a second cylindrical part and a second threaded part. The second threaded part includes internal threads. The holder further includes a second surface facing the image side. The barrel is coupled to the holder via the internal threads and the external threads. A fit between the internal threads and the external threads is a clearance fit. The resilient spring member is sandwiched between the first surface of the barrel and the second surface of the holder.

10 Claims, 4 Drawing Sheets

CAMERA MODULE

BACKGROUND

1. Technical Field

The present disclosure relates to optical imaging, and particularly to a camera module.

2. Description of Related Art

A typical camera module includes a holder and a barrel. In order to keep the barrel in place, the barrel is tightly screwed to the holder. The holder holds the barrel in position using the threads. Because the barrel is tightly screwed, it is difficult to assemble the barrel into the holder during assembly. Sometimes the barrel may become jammed or stuck in the holder.

Therefore, a new camera module is desired to overcome the above-mentioned problem.

BRIEF DESCRIPTION OF THE DRAWINGS

Many aspects of the present embodiment can be better understood with reference to the following drawings. The components in the drawings are not necessarily drawn to scale, the emphasis instead being placed upon clearly illustrating the principles of the present embodiment. Moreover, in the drawings, like reference numerals designate corresponding parts throughout the several views.

DETAILED DESCRIPTION

An embodiment will now be described in detail below with reference to the drawings.

Figure 1:
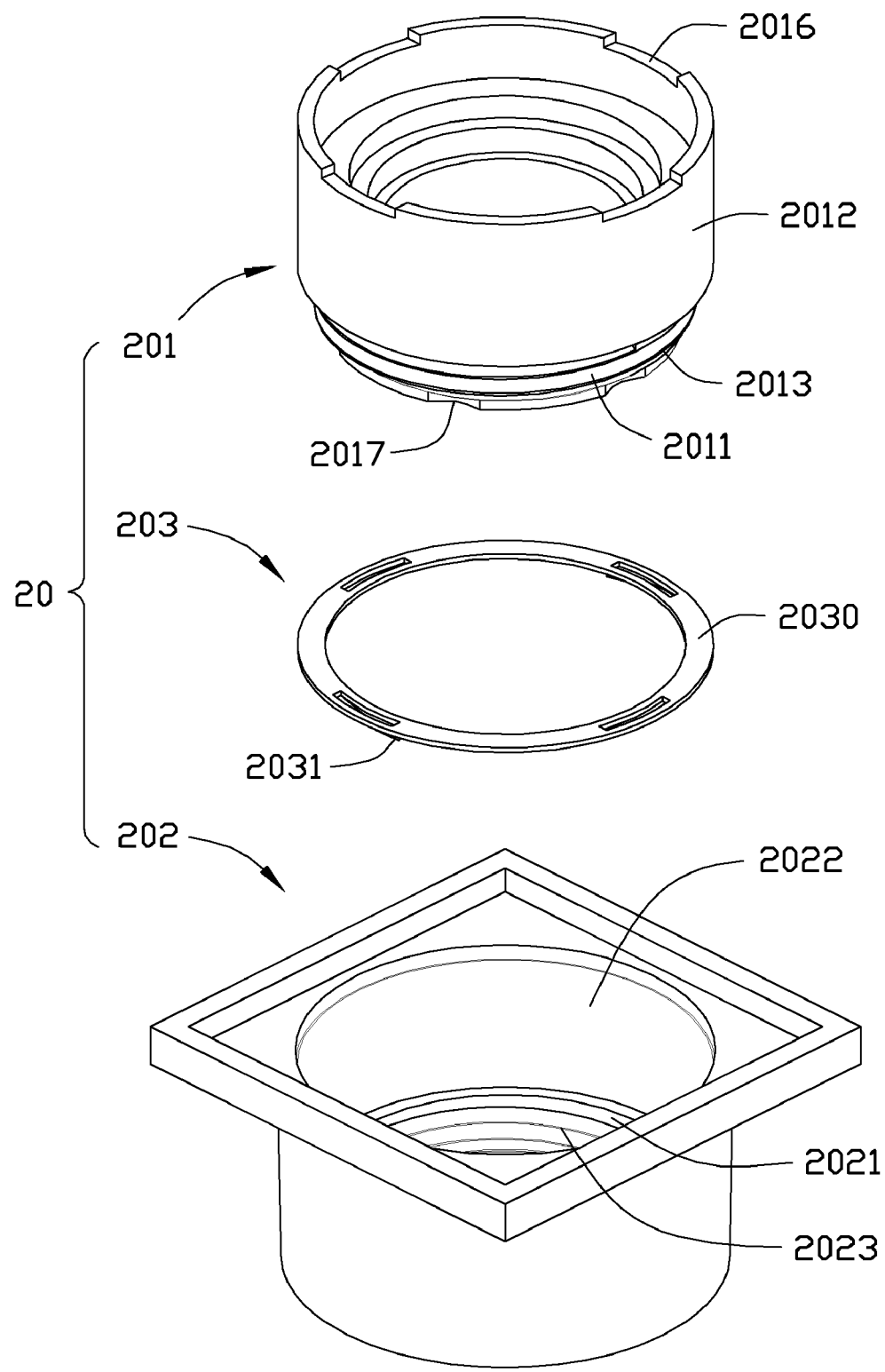
FIG. 1 is an exploded perspective view of a camera module according to an exemplary embodiment.
Figure 2:
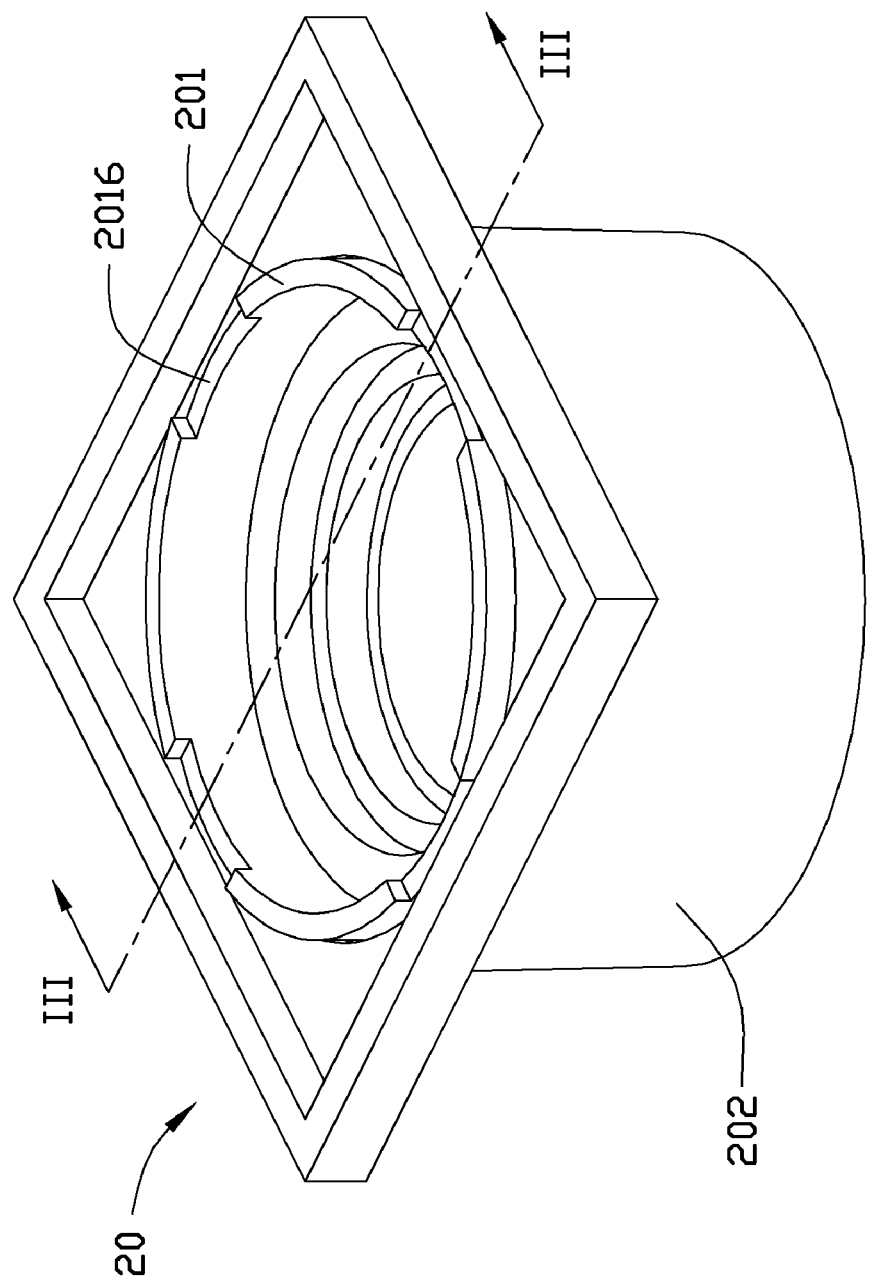
FIG. 2 is an assembled perspective view of the camera module of FIG. 1.
Figure 3:
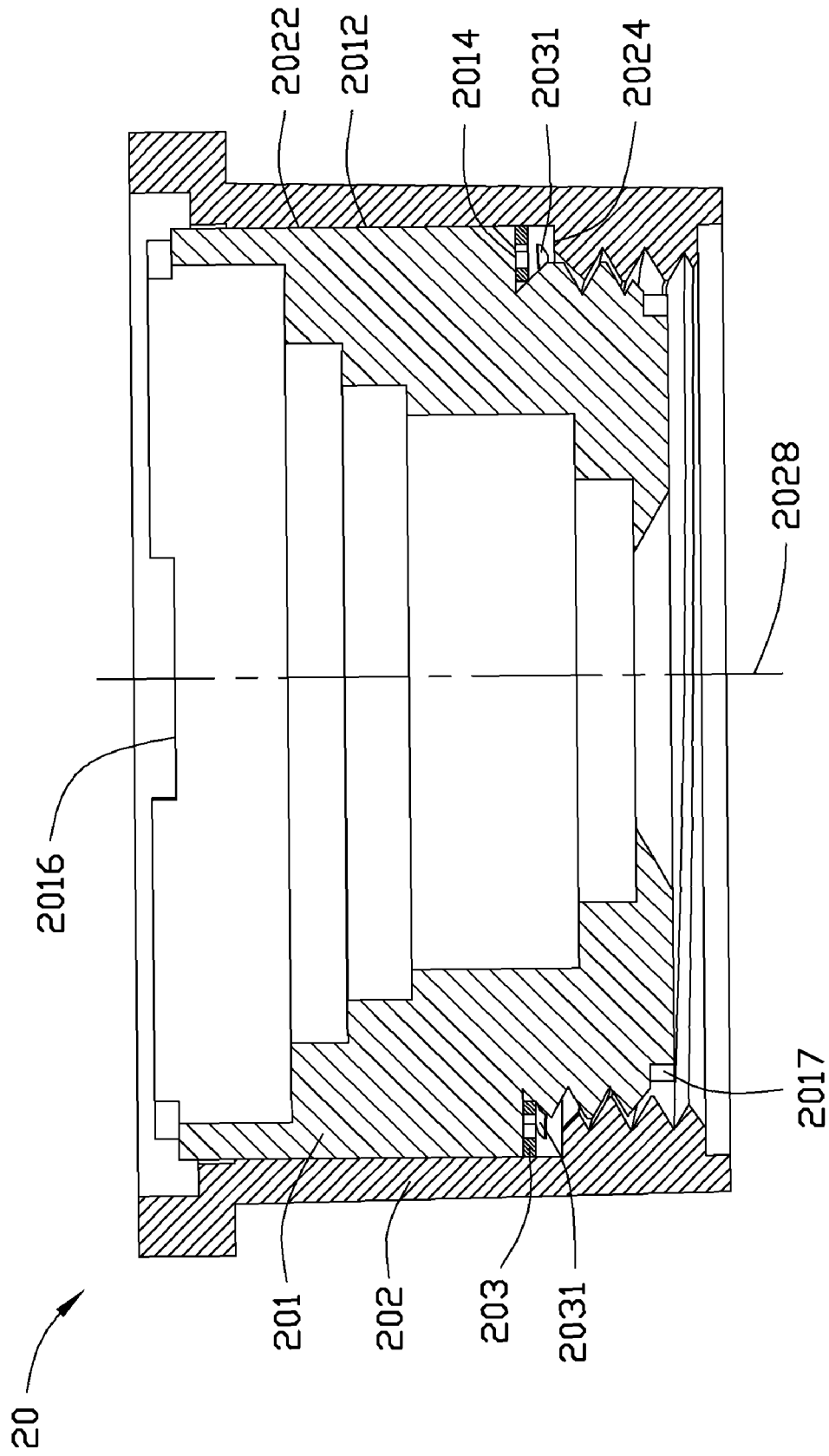
FIG. 3 is a side cross-sectional view of the camera module of FIG. 2 taken along the line III-III thereof.
Figure 4:
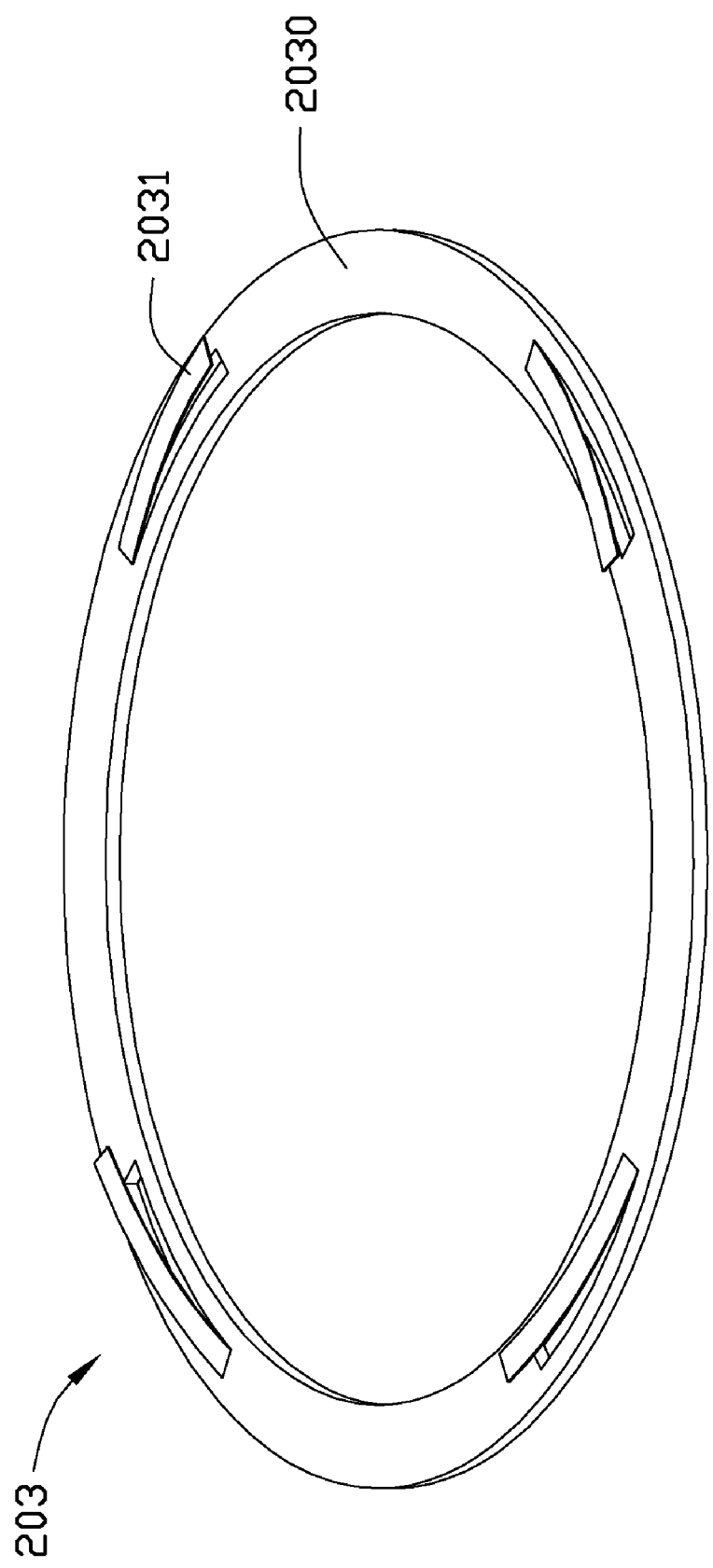
FIG. 4 is a perspective view of a resilient spring member of the camera module of FIG. 1.

Referring to FIGS. 1-3, a camera module 20 according to an exemplary embodiment is shown. The camera module 20 includes a barrel 201, a holder 202, a resilient spring member 203, and a plurality of optical elements (e.g., lenses; not shown) received in the barrel 201.

The barrel 201 includes a first threaded part 2011 and a first cylindrical part 2012 in that order from the object side to the image side. The first threaded part 2011 has a plurality of external threads 2013. In the present embodiment, the first threaded part 2012 consists of 2-3 external threads 2013. An outer diameter of the first cylindrical part 2012 is larger than that of the external threads 2013. The barrel 201 further includes a first surface 2014 connecting the first cylindrical part 2012 and the first threaded part 2011. The first surface 2014 faces the image side.

The holder 202 is hollow and includes a through hole. The barrel 201 is received in the through hole. The holder 202 includes a second threaded part 2021 and a second cylindrical part 2022 from the object side to the image side. The inner cylindrical surface of the second cylindrical part 2022 is in contact with the outer cylindrical surface of the first cylindrical part 2012. The second threaded part 2021 includes a plurality of internal threads 2023. In the present embodiment, the second threaded part 2021 consists of 2-3 internal threads 2023. That is to say, the barrel 201 can only be rotated two to three turns relative to the holder 202. The fit between the internal thread 2023 and the external thread 2013 is a clearance fit. That is, the internal thread 2023 is loosely coupled with the external thread 2013 of the barrel 201. An inner diameter of the second cylindrical part 2022 is larger than an outer diameter of the second threaded part 2022. The holder 202 further includes a second surface 2024 connecting the second cylindrical part 2021 and the second threaded part 2022. The second surface 2024 faces the image side.

The resilient spring member 203 is sandwiched between the first surface 2014 of the barrel 201 and the second surface 2024 of the holder 2024. In the present embodiment, the resilient spring member 203 is a ring-shaped spring. The resilient spring member 203 includes a ring-shaped part 2030 and elastic plates 2031. One end of each elastic plate 2031 is connected to the ring-shaped part 2030, the other end of each elastic plate 2031 curves (or bends) in a direction away from the ring-shaped part 2030, thus forming a free end. When the resilient spring member 203 is compressed along a direction parallel to a central axis 2028 of the holder 202, the resilient spring member 203 exerts a downward spring force towards the second surface 2024 and an upward spring force towards the first surface 2014 both forces acting in directions parallel to the central axis 2028 of the holder 202. The downward spring force is substantially perpendicular to the second surface 2024, and the upward spring force is substantially perpendicular to the first surface 2014. The downward spring force and the upward spring force are in opposite directions. In this way, the barrel 201 is kept stable relative to the holder 202.

In the present embodiment, the resilient spring member 203 includes four elastic plates 2031 equidistant from each other. It is noteworthy that, in other embodiments, the total number of elastic plates can be two, three, or more.

In the present embodiment, the elastic plates 2031 similarly curve away from the same side of the resilient spring member 203. It should be noted that, in other embodiments, the elastic plates 2031 can protrude from different sides (i.e., two opposite sides) of the resilient spring member 203.

Further, a plurality of recesses 2016 are defined in one end of the barrel 201 facing the image side. In assembly of the camera module 20, the barrel 201 can be held in place by a tool (not shown), such as a clamp used at the recesses 2016.

Even further, a plurality of indentations 2017 are defined in the other end of barrel 201 facing the object side. The indentations 2017 are for coupling with a focus ring (not shown) in achieving focus.

After the barrel 201 is coupled to the holder 202, most of the outer cylindrical surface (not labeled) of the first cylindrical part 2012 contacts the inner cylindrical surface (not labeled) of the second cylindrical part 2022. In assembly, the outer cylindrical surface of the first cylindrical part 2012 and the inner cylindrical surface of the second cylindrical part 2022 act as guiding surfaces. Accordingly, it is less likely that the barrel 201 will tilt relative to the holder 202 in assembly.

In the camera module 20, because the fit between the barrel 201 and the holder 202 is a clearance fit, it is easy to assemble the barrel 201 to the holder 202 and rotate the barrel 201 relative to the holder 202 in achieving focusing.

While certain embodiment have been described and exemplified above, various other embodiment from the foregoing disclosure will be apparent to those skilled in the art. The present disclosure is not limited to the particular embodiment described and exemplified but is capable of considerable variation and modification without departure from the scope and spirit of the appended claims.

What is claimed is:

1. A camera module comprising:

a barrel comprising a first cylindrical part and a first threaded part connected to the first cylindrical part in an order from an image side to an object side, the first threaded part comprising a plurality of external threads, the barrel further comprising a first surface connecting the first cylindrical part and the first threaded part, the first surface facing the object side;

a holder comprising a second cylindrical part and a second threaded part connected to the second cylindrical part in an order from the image side to the object side, the second threaded part comprising a plurality of internal threads, the holder further comprising a second surface connecting the second cylindrical part and the second threaded part, the second surface facing the image side, the barrel being coupled to the holder through clearance fit engagement between the internal threads and the external threads; and a compressed resilient spring member sandwiched between the first surface of the barrel and the second surface of the barrel, the resilient spring member being configured for exerting a first spring force to the barrel and a second spring force to the holder so that the barrel is secured to the holder.

2. The camera module of claim 1, wherein the holder comprising a central axis, and the first and second spring forces are in a direction substantially parallel to the central axis of the holder.

3. The camera module of claim 1, wherein the inner cylindrical surface of the second cylindrical part is in contact with the outer cylindrical surface of the first cylindrical part.

4. The camera module of claim 1, wherein an outer diameter of the first cylindrical part is larger than that of the external threads, and an inner diameter of the second cylindrical part is larger than an outer diameter of the internal threads.

5. The camera module of claim 1, wherein the resilient spring member is ring-shaped, and the barrel extends through the resilient spring member.

6. The camera module of claim 5, wherein the resilient spring member comprises a ring-shaped part and a plurality of spring plates, one end of each elastic plate is connected to the ring-shaped part, and another end of each elastic plate curves in a direction away from the ring-shaped part, thus forming a free end.

7. The camera module of claim 1, wherein the first spring force is substantially perpendicular to the first surface of the barrel, and the second spring force is substantially perpendicular to the second surface of the holder.

8. The camera module of claim 1, wherein the first and the second spring forces are in reverse directions.

9. The camera module of claim 1, wherein the first threaded part consists of 2-3 external threads.

10. The camera module of claim 1, wherein the second threaded part consists of 2-3 internal threads.

* * * * *